US012436490B2

(12) United States Patent
Takase

(10) Patent No.: US 12,436,490 B2
(45) Date of Patent: Oct. 7, 2025

(54) IMAGE FORMING APPARATUS INCLUDING DRIVE SOURCE

(71) Applicant: CANON KABUSHIKI KAISHA, Tokyo (JP)

(72) Inventor: Kazuki Takase, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/643,398

(22) Filed: Apr. 23, 2024

(65) Prior Publication Data

US 2024/0369958 A1 Nov. 7, 2024

(30) Foreign Application Priority Data

May 1, 2023 (JP) ................................. 2023-075871

(51) Int. Cl.
*G03G 15/00* (2006.01)
*G03G 15/23* (2006.01)
(Continued)

(52) U.S. Cl.
CPC ......... *G03G 15/757* (2013.01); *G03G 15/234* (2013.01); *G03G 15/6579* (2013.01);
(Continued)

(58) Field of Classification Search
CPC .. G03G 15/757; G03G 15/6579; G03G 21/12; G03G 21/206; G03G 21/1647;
(Continued)

(56) References Cited

U.S. PATENT DOCUMENTS 4,878,087 A * 10/1989 Sakai ................. G03G 15/6579 271/902
9,915,896 B2 3/2018 Oyama et al.
(Continued)

FOREIGN PATENT DOCUMENTS

JP 2005043823 A 2/2005
JP 2011037615 A 2/2011
(Continued)

*Primary Examiner* — Stephanie E Bloss
*Assistant Examiner* — Laura Roth
(74) *Attorney, Agent, or Firm* — ROSSI, KIMMS & McDOWELL LLP

(57) ABSTRACT

An image forming apparatus includes an image forming portion including a photosensitive member that is rotatably supported about a rotation shaft extending in a first direction and a transfer member, a fixing portion, a reverse conveyance portion, a conveyance path, a conveyance portion, a drive source, and a drive input portion, the drive input portion being attached to the conveyance portion. The drive source is disposed between the transfer member and the fixing portion in a second direction parallel to a sheet conveyance direction in the conveyance portion. The drive input portion is disposed so as to overlap the drive source with respect to the first direction, so as to overlap the drive source with respect to a third direction orthogonal to both of the first direction and the second direction, and so as not to overlap the drive source with respect to the second direction.

16 Claims, 9 Drawing Sheets

(51) Int. Cl.
*G03G 21/12* (2006.01)
*G03G 21/20* (2006.01)

(52) U.S. Cl.
CPC ........... *G03G 21/12* (2013.01); *G03G 21/206* (2013.01); *G03G 2215/0043* (2013.01); *G03G 2221/1657* (2013.01)

(58) Field of Classification Search
CPC ........... G03G 2221/1657; G03G 15/23; G03G 15/234; G03G 2215/0043
See application file for complete search history.

(56) References Cited

U.S. PATENT DOCUMENTS

| | | | | |
|---|---|---|---|---|
| 2001/0054787 | A1* | 12/2001 | Yamagishi | B65H 5/062 271/3.17 |
| 2006/0290049 | A1* | 12/2006 | Fujiwara | B65H 15/00 271/225 |
| 2010/0303502 | A1* | 12/2010 | Miwa | G03G 15/234 399/167 |
| 2011/0156336 | A1* | 6/2011 | Agata | B65H 5/062 271/3.19 |

FOREIGN PATENT DOCUMENTS

| | | | |
|---|---|---|---|
| JP | 2016045375 | A | 4/2016 |
| JP | 2017138553 | A | 8/2017 |

* cited by examiner

IMAGE FORMING APPARATUS INCLUDING DRIVE SOURCE

BACKGROUND OF THE INVENTION

Field of the Invention

The present invention relates to an image forming apparatus that forms an image on a sheet.

Description of the Related Art

JP 2016-45375 A proposes a printer including a process cartridge including a photosensitive drum and a left side plate and a right side plate that detachably support the process cartridge. A motor is disposed between the left side plate and the right side plate, and a driving force of the motor is transmitted to a body coupling via a gear train. The process cartridge includes a drum coupling that rotates together with the photosensitive drum, and when the drum coupling is engaged with the body coupling, the driving force is transmitted from the motor to the photosensitive drum. Further, the printer includes a duplex printing path for conveying a sheet on which an image is formed on a first surface toward the photosensitive drum again.

There is a desire to miniaturize the printer capable of duplex printing on a sheet as disclosed in JP 2016-45375 A.

SUMMARY OF THE INVENTION

According to one aspect of the present invention, an image forming apparatus includes an image forming portion including a photosensitive member that is rotatably supported about a rotation shaft extending in a first direction and bears a toner image, and a transfer member that transfers the toner image to a sheet, a fixing portion configured to fix the toner image transferred by the transfer member to the sheet, a reverse conveyance portion configured to reverse and convey the sheet conveyed by the fixing portion, a conveyance path configured to guide the sheet reversed by the reverse conveyance portion toward the transfer member again, a conveyance portion configured to convey the sheet in the conveyance path, a drive source configured to drive the photosensitive member and the conveyance portion, and a drive input portion configured to input a driving force transmitted from the drive source to the conveyance portion, the drive input portion being attached to the conveyance portion. The drive source is disposed between the transfer member and the fixing portion in a second direction parallel to a sheet conveyance direction in the conveyance portion. The drive input portion is disposed so as to overlap the drive source with respect to the first direction, so as to overlap the drive source with respect to a third direction orthogonal to both of the first direction and the second direction, and so as not to overlap the drive source with respect to the second direction.

Further features of the present invention will become apparent from the following description of exemplary embodiments with reference to the attached drawings.

DESCRIPTION OF THE EMBODIMENTS

First Embodiment

Overall Configuration

Hereinafter, an embodiment in a case of being applied to an electrophotographic laser printer will be specifically described as an example of a configuration of an image forming apparatus according to the present invention.

Figure 1:
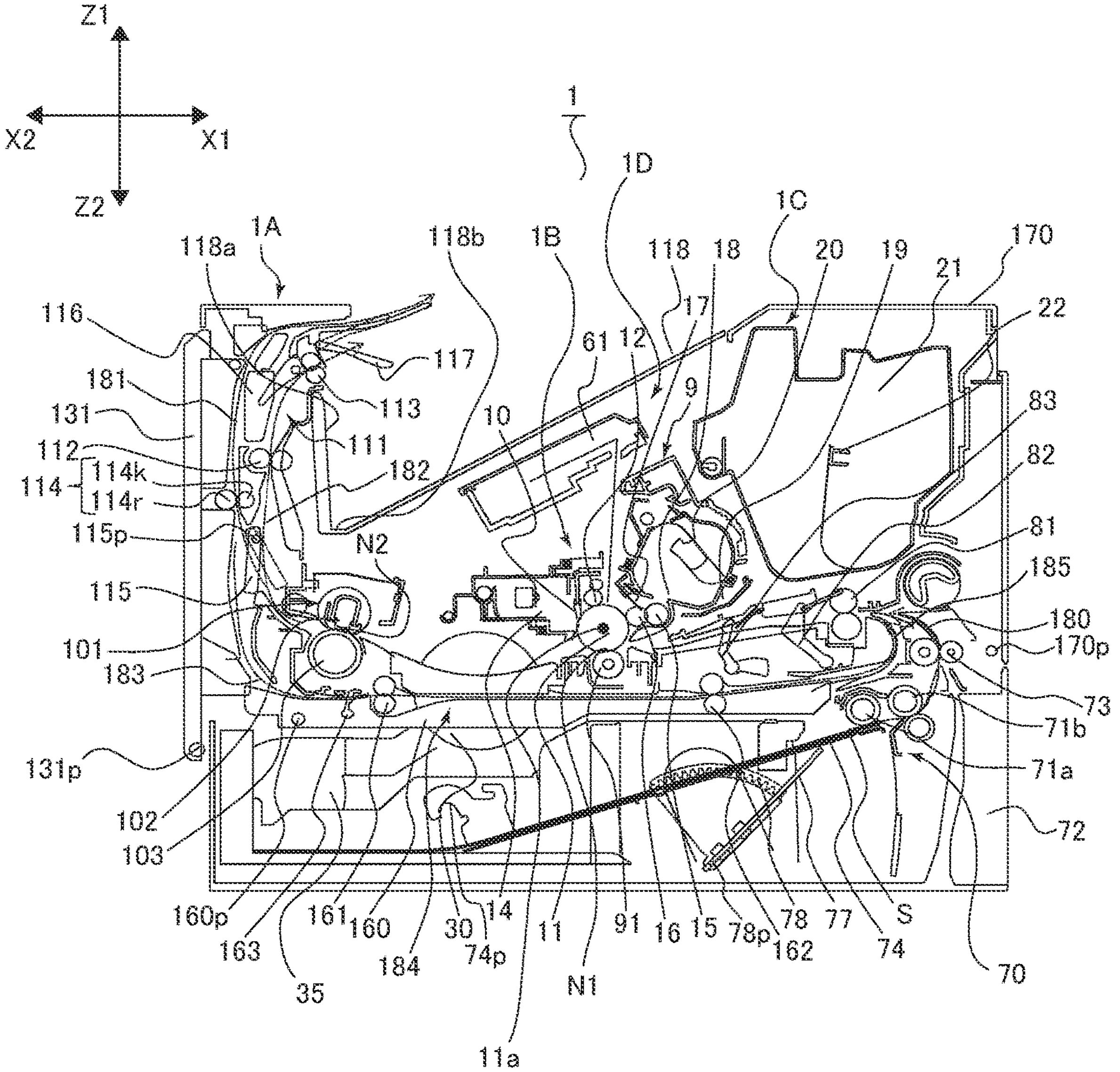
FIG. 1 is a cross-sectional view illustrating an image forming apparatus according to a first embodiment.

FIG. 1 is a cross-sectional view illustrating a configuration of an image forming apparatus according to a first embodiment. However, the dimensions, materials, shapes, relative arrangements, and the like of components described in the present embodiment are not intended to limit the scope of the present invention unless otherwise specified.

The image forming apparatus includes a printer, a copier, a facsimile, and a multifunction peripheral, and refers to an apparatus that forms an image on a sheet used as a recording medium based on image information input from an external personal computer (PC) or image information read from a document. In addition to a body having an image forming function, the image forming apparatus may be connected to accessory equipment such as an option feeder, an image reading device, or a sheet processing device, and the entire system to which such accessory equipment is connected is also a type of the image forming apparatus.

As illustrated in FIG. 1, the image forming apparatus 1 includes an apparatus body 1A, a process cartridge 1B, and a toner cartridge 1C. In addition, the process cartridge 1B and the toner cartridge 1C are attachable to and detachable from the apparatus body 1A.

The process cartridge 1B includes a cleaning unit 8 including a photosensitive drum 11 serving as a photosensitive member, and a developing unit 9 including a developing roller 16 that bears a developer containing toner. The cleaning unit 8 includes the photosensitive drum 11, a cleaning blade 10, a charging roller 12, and a waste toner storage portion 14. The photosensitive drum 11 is rotatably supported about a rotation shaft 11*a* extending in a Y direction, and bears a toner image. The charging roller 12 is disposed so as to be in contact with an outer peripheral surface of the photosensitive drum 11, and charges the photosensitive drum 11 as a voltage is applied from the apparatus body 1A. Further, the charging roller 12 rotates following the photosensitive drum 11.

The cleaning blade 10 is an elastic member disposed so as to be in contact with the outer peripheral surface of the photosensitive drum 11. A distal end of the cleaning blade 10 is in elastic contact with the photosensitive drum 11 to remove toner remaining on the photosensitive drum 11 after the toner image is transferred to a sheet S described below. Waste toner, which is the removed toner, is conveyed to the toner cartridge 1C through a waste toner conveyance path (not illustrated) via the waste toner storage portion 14, and is stored in a waste toner collection portion (not illustrated).

The developing unit 9 includes the developing roller 16, a supply roller 15, a developing blade 17, a developing chamber 18, a toner storage chamber 19, and a stirring member 20. The developing roller 16 supplies toner to a developing region of the photosensitive drum 11. Then, the developing roller 16 develops an electrostatic latent image formed on the photosensitive drum 11 as the toner image by using the toner. The supply roller 15 supplies the toner to the developing roller 16. The developing blade 17 abuts on a peripheral surface of the developing roller 16 to define the amount of the toner to adhere to the peripheral surface of the developing roller 16. The developing blade 17 applies triboelectric charge to the toner.

The toner stored in the toner storage chamber 19 is sent to the developing chamber 18 by rotation of the stirring member 20 and supplied to the developing roller 16. A remaining amount of the toner in the toner storage chamber 19 is detected by a remaining amount detection portion (not illustrated). When the amount of the toner in the toner storage chamber 19 becomes equal to or less than a certain amount, the toner is supplied from the toner cartridge 1C to the process cartridge 1B by a supply portion (not illustrated).

The toner cartridge 1C includes a toner storage portion 21 and a stirring and conveying unit 22. When the toner is supplied from the toner cartridge 1C to the toner storage chamber 19 of the process cartridge 1B, the stirring and conveying unit 22 conveys the toner stored in the toner storage portion 21 toward the supply portion (not illustrated).

The apparatus body 1A includes a sheet feeding portion 70, a transfer roller 91, a laser scanner 61, a fixing portion 101, a discharge reversing unit 111, a duplex conveyance unit 184, and the like. The laser scanner 61, the transfer roller 91, and the process cartridge 1B form an image forming portion 1D that forms an image on the sheet S. The sheet feeding portion 70 includes a cassette 72 detachably supported by the apparatus body 1A, a pickup roller 71*a*, and a separation roller pair 71*b*. In the present embodiment, the cassette 72 can be pulled out from the apparatus body 1A toward a front side of the image forming apparatus 1, that is, in an X1 direction, and can be mounted in an X2 direction.

The sheet S includes paper such as a sheet or an envelope, a plastic film such as a sheet for an overhead projector (OHP), cloth, and the like.

The cassette 72 includes a middle plate 74 that supports the sheet S and is provided so as to be movable up and down about a pivot shaft 74*p*, and a lifting arm 77 that is provided so as to be pivotable about a pivot shaft 78*p*. When a lifting gear 78 rotates, the lifting arm 77 pivots about the pivot shaft 78*p*. When the lifting arm 77 pivots upward about the pivot shaft 78*p*, the lifting arm 77 lifts the middle plate 74 upward about the pivot shaft 74*p*.

The transfer roller 91 serving as a transfer member forms a transfer nip N1 together with the photosensitive drum 11. The fixing portion 101 includes a heating roller 102 incorporating a heater, and a pressure roller 103 that is in pressure contact with the heating roller 102 and forms a fixing nip N2 together with the heating roller 102.

The discharge reversing unit 111 includes a guide member 115, a discharge conveyance path 182, an intermediate conveyance roller pair 112, a sheet discharge roller pair 113, a full load detection flag 117, a reverse conveyance path 181, a reverse conveyance roller pair 114, an intermediate conveyance guide 116, and the like. The guide member 115 is pivotably supported about a pivot center boss 115*p*, and is configured to be pivotable between a discharge position indicated by a solid line in FIG. 1 and a reversing position indicated by a broken line in FIG. 1. When the guide member 115 is positioned at the discharge position, the guide member 115 guides the sheet S sent from the fixing portion 101 toward the discharge conveyance path 182. Further, when the guide member 115 is positioned at the reversing position, the guide member 115 guides the sheet S sent from the fixing portion 101 toward the reverse conveyance path 181.

The intermediate conveyance roller pair 112 is disposed between the fixing portion 101 and the sheet discharge roller pair 113, and conveys the sheet S passing through the discharge conveyance path 182 toward the sheet discharge roller pair 113. The reverse conveyance roller pair 114 serving as a reverse conveyance portion is disposed above the guide member 115. The reverse conveyance roller pair 114 once conveys the sheet S conveyed to the reverse conveyance path 181 upward and then conveys the sheet S downward. That is, the reverse conveyance roller pair 114 switches back the sheet S and conveys the sheet S toward the duplex conveyance unit 184.

The duplex conveyance unit 184 includes a duplex conveyance path 183 serving as a conveyance path through which the sheet S conveyed from the reverse conveyance path 181 passes, a duplex conveyance guide 160, a duplex sensor 163, and conveyance roller pairs 161 and 162. The duplex conveyance guide 160 forms at least a part of the duplex conveyance path 183 and guides the sheet S. The duplex sensor 163 detects a position of a leading edge of the sheet S passing through the duplex conveyance path 183. The conveyance roller pairs 161 and 162 convey the sheet S passing through the duplex conveyance path 183. A U-shaped portion 185 curved in a U shape is provided at a downstream end portion of the duplex conveyance path 183 in the sheet conveyance direction, and the sheet S is conveyed to a registration roller pair 81 via the U-shaped portion 185.

When an image forming command is output to the image forming apparatus 1, an image forming process in the image forming portion 1D is started based on image information input from an external computer or the like connected to the image forming apparatus 1. The laser scanner 61 irradiates the photosensitive drum 11 with laser light based on the input image information. At this time, the photosensitive drum 11 is charged in advance by the charging roller 12, and an electrostatic latent image is formed on the photosensitive drum 11 irradiated with the laser light. Thereafter, the electrostatic latent image is developed by the developing roller 16, and a monochrome toner image is formed on the photosensitive drum 11.

In parallel with the above-described image forming process, the sheet S is fed from the sheet feeding portion 70. When the sheet S is fed from the sheet feeding portion 70, the lifting arm 77 is driven, so that the middle plate 74 pivots upward about the pivot shaft 74*p*. Thus, the sheet S placed on the middle plate 74 abuts on the pickup roller 71*a*. In this state, the pickup roller 71*a* and the separation roller pair 71*b* are driven, and the sheet S is fed by the pickup roller 71*a*. Further, the sheets S fed by the pickup roller 71*a* are separated and conveyed one by one by the separation roller pair 71*b*.

The sheet S separated one by one by the separation roller pair 71*b* is conveyed to the registration roller pair 81 through a feeding conveyance path 180 by a conveyance roller pair 73, and skew feeding is corrected by the registration roller pair 81. A paper width sensor 82 and a registration sensor 83 are disposed downstream of the registration roller pair 81 in the sheet conveyance direction. The paper width sensor 82 detects a size of the sheet in a width direction, the sheet being conveyed at a predetermined conveyance timing by the registration roller pair 81, and the registration sensor 83 detects the position of the leading edge of the sheet S. The width direction is a direction orthogonal to the sheet conveyance direction and a thickness direction of the sheet S.

The fixing portion 101 controls the heater incorporated in the heating roller 102 according to the size of the sheet S in the width direction detected by the paper width sensor 82. The image forming apparatus 1 determines a timing at which the toner image is to be formed based on the position of the leading edge of the sheet S detected by the registration sensor 83.

Then, when an electrostatic load bias is applied to the transfer roller 91, the toner image on the photosensitive drum 11 is transferred to the sheet S at the transfer nip N1. The remaining toner on the photosensitive drum 11 is collected in the waste toner storage portion 14 by the cleaning blade 10. Predetermined heat and pressure are applied to the sheet S to which the toner image has been transferred at the fixing nip N2 by the heating roller 102 and the pressure roller 103 of the fixing portion 101, and the toner is melted and fixed.

In a case where the toner image is formed on only one surface of the sheet S, the sheet S having passed through the fixing portion 101 is guided to the discharge conveyance path 182 by the guide member 115 positioned at the discharge position. Then, the sheet S is conveyed to the sheet discharge roller pair 113 by the intermediate conveyance roller pair 112 via the discharge conveyance path 182. The sheet discharge roller pair 113 discharges the sheet S to the outside of the apparatus, and the sheet S is stacked on a sheet discharge tray 118 formed in an upper surface of the image forming apparatus 1.

When the sheet discharge roller pair 113 discharges the sheet S to the outside of the apparatus, the full load detection flag 117 is swung up from a standby position indicated by a solid line in FIG. 1 toward a position indicated by a broken line by being pressed by the sheet S. When a height of the sheets S stacked on the sheet discharge tray 118 reaches a predetermined height, the full load detection flag 117 positioned at the standby position abuts on the sheet S stacked on the sheet discharge tray 118. Then, when the sheet S is further discharged to the sheet discharge tray 118 and the full load detection flag 117 pivots by a predetermined angle or more from the standby position, it is determined that the sheet discharge tray 118 is in a full-load state, and the conveyance of the sheet S by the image forming apparatus 1 is stopped.

In the present embodiment, the sheet discharge tray 118 is inclined downward in a vertical direction (Z direction) as it goes upstream in a discharge direction of the sheet S aligned with the X1 direction. As a result, the sheet S discharged to the sheet discharge tray 118 slides down along the sheet discharge tray 118 and abuts on a regulating surface 118*a*. Accordingly, the sheet S is aligned in the discharge direction. In the present embodiment, the Z direction which is parallel to a vertical direction is orthogonal to both of the Y direction (a first direction) and the X direction (a second direction).

In the present embodiment, a lowermost portion 118*b* of the sheet discharge tray 118 in the vertical direction, which is continuous with the regulating surface 118*a*, is positioned at a position lower than the intermediate conveyance roller pair 112. As described above, the sheet discharge tray 118 is formed to be relatively deep, so that a large amount of sheets S can be stacked. When the sheet discharge tray 118 is formed deep, the discharge conveyance path 182 between the fixing portion 101 and the sheet discharge roller pair 113 becomes long. However, in the present embodiment, since the intermediate conveyance roller pair 112 is disposed between the fixing portion 101 and the sheet discharge roller pair 113, even a minimum-sized sheet that can be conveyed by the image forming apparatus 1 can be reliably conveyed on the discharge conveyance path 182.

In a case of forming toner images on both surfaces of the sheet S, the guide member 115 is positioned at the reversing position in advance. Then, an image is formed on a first surface, and the sheet S having passed through the fixing portion 101 is guided to the reverse conveyance path 181 by the guide member 115 positioned at the reversing position. The reverse conveyance path 181 is provided with the reverse conveyance roller pair 114 including a reverse driving roller 114*r* implemented by a rubber roller and a reverse driven roller 114*k* that rotates following the reverse driving roller 114*r*. A rotation direction of the reverse conveyance roller pair 114 is switched by a rotation direction switching portion (not illustrated) at a timing when a trailing edge of the sheet S reaches a predetermined position. The guide member 115 moves from the reversing position to the discharge position.

As a result, the sheet S is switched back in the reverse conveyance path 181, and is guided to the duplex conveyance path 183 of the duplex conveyance unit 184 by the guide member 115 positioned at the discharge position. The position of the leading edge of the sheet S conveyed to the duplex conveyance path 183 is detected by the duplex sensor 163. The image forming apparatus 1 grasps a timing at which the sheet S enters the conveyance roller pair 161 based on a detection result of the duplex sensor 163.

The conveyance roller pair 161 serving as a conveyance portion and a first conveyance portion is in a stopped state, and the sheet S abuts against a nip of the conveyance roller pair 161 in the stopped state, so that skew feeding is corrected. Then, the conveyance roller pair 161 is driven after a predetermined time from when the duplex sensor 163 detects the position of the leading edge of the sheet S. The sheet S is conveyed to the registration roller pair 81 via the U-shaped portion 185 by the conveyance roller pairs 161 and 162. The toner image is transferred to a second surface of the sheet S at the transfer nip N1, and the toner image is fixed to the sheet S by the fixing portion 101. Then, the sheet S is discharged to the sheet discharge tray 118 by the sheet discharge roller pair 113 via the discharge conveyance path 182.

Arrangement of Components of Apparatus Body

Next, a characteristic arrangement of components of the apparatus body 1A will be described with reference to FIG. 1. As illustrated in FIGS. 1 and 5A to 5C, directions (X1, X2, Y1, Y2, Z1, and Z2) are defined as follows.

An upward-downward direction is indicated by a Z axis. Arrow Z1 indicates an upward direction, and Arrow Z2 indicates a downward direction. A surface provided at an end of the image forming apparatus 1 in the Z1 direction is referred to as a top surface (upper surface), and a surface provided at an end of the image forming apparatus 1 in the Z2 direction is referred to as a bottom surface (bottom portion, lower portion, or lower end). The top surface of the image forming apparatus 1 faces upward (Z1 direction), and the bottom surface faces downward (Z2 direction). The Z1 direction and the Z2 direction may be collectively referred to as the upward-downward direction, a height direction, the vertical direction, a gravity direction, the Z direction, or a Z-axis direction.

A front-rear direction is indicated by an X axis. A direction toward an upstream side in a mounting direction when the cassette 72 is mounted on the apparatus body 1A of the image forming apparatus 1 is defined as the X1 direction, and a direction toward a downstream side in the mounting direction is defined as the X2 direction. For convenience, the X1 direction is referred to as the front, and the X2 direction is referred to as the rear. That is, a surface provided at an end of the image forming apparatus 1 in the X1 direction is referred to as a front surface (front portion or front end) of the image forming apparatus 1, and a surface provided at an end of the image forming apparatus 1 in the X2 direction is referred to as a rear surface (back surface, rear end, or rear portion).

The front surface of the image forming apparatus 1 faces the front (X1 direction), and the rear surface faces the rear (X2 direction). The X1 direction and the X2 direction may be collectively referred to as the front-rear direction, an X direction, or an X-axis direction.

Figure 3:
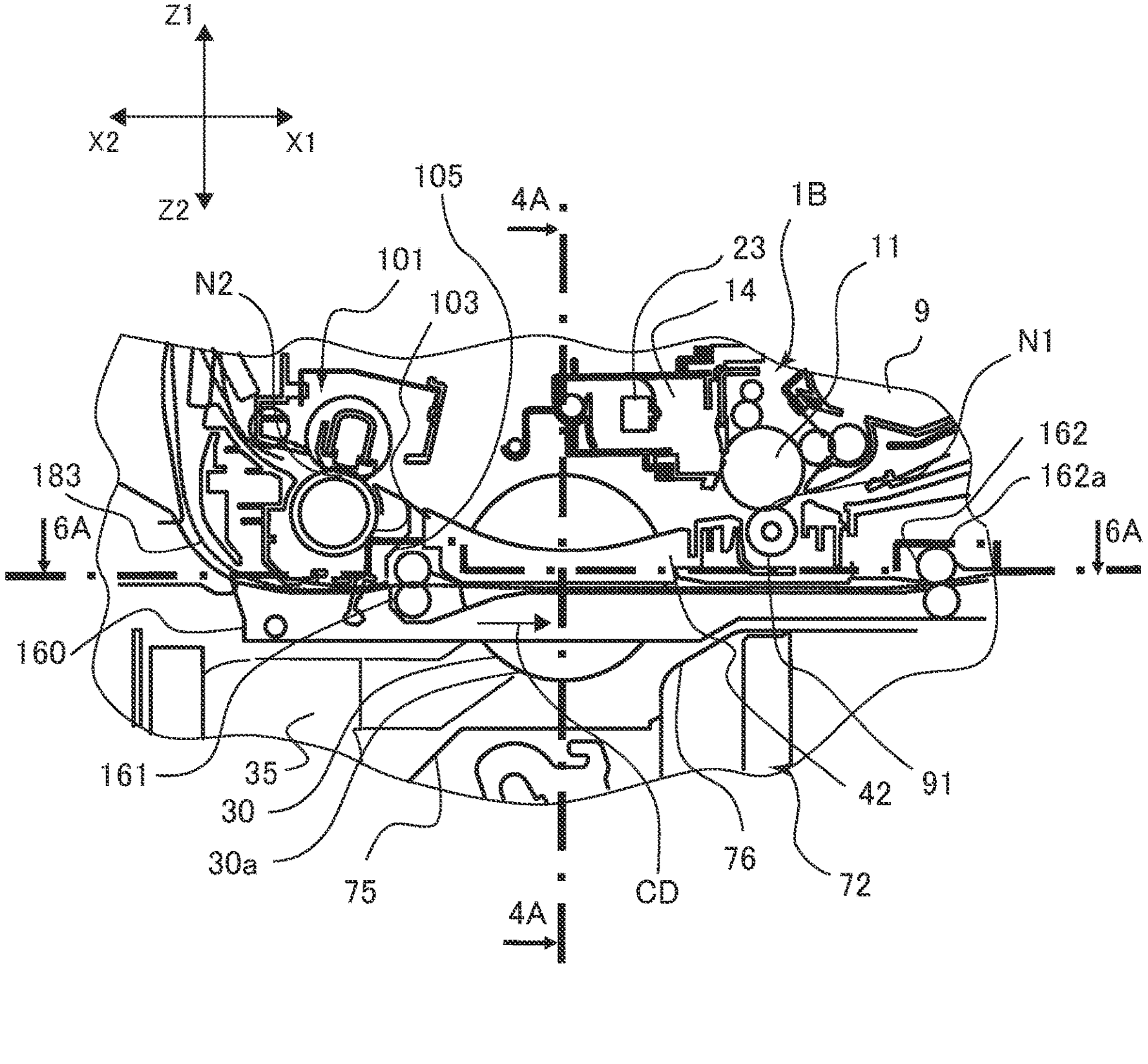
FIG. 3 is a cross-sectional view illustrating a peripheral configuration of a motor.

Further, as illustrated in FIG. 3, a left-right direction of the image forming apparatus 1 is indicated by a Y axis. For convenience, Arrow Y1 indicates a left direction when the cassette 72 is viewed in the mounting direction (that is, the X2 direction) at the time of mounting to the apparatus body 1A, and Arrow Y2 indicates a right direction. A surface provided at an end of the image forming apparatus 1 in the Y1 direction is referred to as a left side surface (left surface, left end, or left portion), and a surface provided at an end of the image forming apparatus 1 in the Y2 direction is referred to as a right side surface (right surface, right portion, or right end). The Y1 direction and the Y2 direction may be collectively referred to as the left-right direction, a lateral direction, the width direction, a Y direction, a Y-axis direction, or the like.

The X axis, the Y axis, and the Z axis are perpendicular to each other. For example, the X axis is perpendicular to the Y axis and is also perpendicular to the Z axis. In addition, a plane perpendicular to the X axis may be referred to as a YZ plane, a plane perpendicular to the Y axis may be referred to as a ZX plane, and a plane perpendicular to the Z axis may be referred to as an XY plane. For example, the XY plane is a horizontal plane. The X direction and the Y direction are directions along the XY plane which is a horizontal plane, that is, horizontal directions.

As illustrated in FIG. 1, the reverse conveyance roller pair 114 is disposed below the intermediate conveyance roller pair 112 in the Z direction. The reverse conveyance roller pair 114 is disposed below in order to shorten the duplex conveyance path 183 and improve productivity in duplex printing. The reverse conveyance roller pair 114 and the intermediate conveyance roller pair 112 are disposed so as to at least partially overlap each other in the X direction serving as a second direction. As a result, the image forming apparatus 1 can be downsized in the X direction.

The conveyance roller pairs 161 and 162 are disposed at positions where a relatively long sheet such as an A4-sized sheet or an LTR-sized sheet can be stably conveyed to the U-shaped portion 185 having a small curvature and a large conveying resistance. The A4-sized sheet has a length of 297 mm in a longitudinal direction and the LTR-sized sheet has a length of 279.4 mm in the longitudinal direction.

The conveyance roller pair 161 is disposed at a position separated from the reverse conveyance roller pair 114 by a distance of 210 mm or less along the duplex conveyance path 183. Similarly, the conveyance roller pair 162 serving as a second conveyance portion is disposed at a position separated from the conveyance roller pair 161 by a distance of 210 mm or less along the duplex conveyance path 183. A vertical A5-sized sheet, which is the minimum-sized sheet that can be conveyed in the duplex conveyance path 183, has a length of 210 mm in the longitudinal direction. Since the conveyance roller pairs 161 and 162 are disposed as described above, the conveyance roller pairs 161 and 162 can stably convey the minimum-sized sheet conveyed by the reverse conveyance roller pair 114 to the duplex conveyance path 183.

The conveyance roller pair 161 is disposed as close as possible to the fixing portion 101, and the degree of freedom in arrangement of the reverse conveyance roller pair 114 in the Z1 direction is improved. For example, in a product having a small capacity for sheets that can be stacked on the sheet discharge tray 118, the sheet discharge roller pair 113 and the reverse conveyance roller pair 114 may be integrated as one roller pair. In this case, it is possible to implement a configuration in which it is not necessary to additionally provide an intermediate conveyance roller pair between the reverse conveyance roller pair 114 (one roller pair) and the conveyance roller pair 161 in the reverse conveyance path 181.

The conveyance roller pairs 161 and 162 are disposed so as to at least partially overlap the transfer roller 91 in the Z direction. As a result, the image forming apparatus 1 can be downsized in the Z direction.

At least a part of the lifting gear 78 is disposed downstream of the conveyance roller pair 162 in the X1 direction. This is due to the following reasons. First, the conveyance roller pair 162 is disposed so as to avoid the transfer roller 91, the paper width sensor 82, and the registration sensor 83. Further, the conveyance roller pair 162 is disposed at a position separated from the conveyance roller pair 161 by a distance of 210 mm or less along the duplex conveyance path 183. As a result, the conveyance roller pair 162 can stably convey the minimum-sized sheet conveyed to the duplex conveyance path 183.

Next, the lifting gear 78 is disposed such that the pivot shaft 78*p* of the lifting gear 78 is as close as possible to the pivot shaft 74*p* of the middle plate 74 in the X direction. This is to prevent a relationship between a pivoting amount of the lifting gear 78 and an upward and downward movement amount of the middle plate 74 from changing as much as possible according to the amount of the sheet S stored in the cassette 72. As a result, the sheet S can be stably fed by the sheet feeding portion 70. For the above reason, the lifting gear 78 and the conveyance roller pair 162 have the above-described arrangement relationship.

Configuration for Jam Handling

Figure 2:
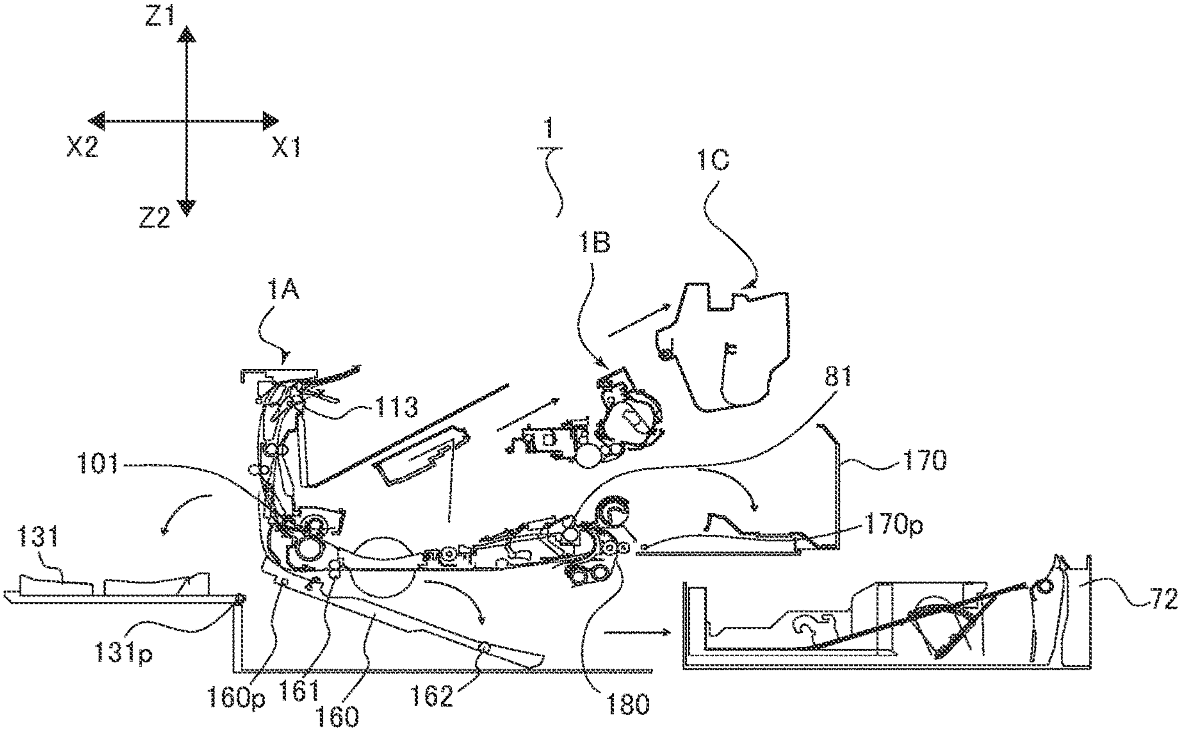
FIG. 2 is a cross-sectional view illustrating the image forming apparatus in a state where a front door, a rear door, and a duplex conveyance guide are opened.

Next, a configuration for jam handling when the sheet S is jammed in the apparatus body 1A of the image forming apparatus 1 will be described with reference to FIGS. 1 and 2. As illustrated in FIGS. 1 and 2, the image forming apparatus 1 includes a front door 170 and a rear door 131 provided so as to be openable and closable with respect to the apparatus body 1A. The front door 170 is provided on the front surface of the image forming apparatus 1 and is pivotable about a pivot center 170*p*. The rear door 131 is provided on the rear surface of the image forming apparatus 1, and is pivotable about a pivot shaft 131*p* extending in the Y direction serving as a first direction (see FIG. 4). The duplex conveyance guide 160 is pivotable about a pivot center 160*p*, and can open the duplex conveyance path 183.

In a case where a jam occurs in a state where the leading edge of the sheet S is in the feeding conveyance path 180, the user pulls out the cassette 72 from the apparatus body 1A in the X1 direction. As a result, the user can access the feeding conveyance path 180 and can perform jam handling.

In a case where a jam occurs in a state where the leading edge of the sheet S is between the feeding conveyance path 180 and the fixing portion 101, the user opens the front door 170. Then, the user removes the toner cartridge 1C and the process cartridge 1B from the apparatus body 1A. As a result, the user can access the jammed sheet S and perform jam handling.

In a case where a jam occurs in a state where the leading edge of the sheet S is between the fixing portion 101 and the sheet discharge roller pair 113, or in a case where a jam occurs in a state where the leading edge of the sheet S that has been switched back is between the fixing portion 101 and the conveyance roller pair 161, the user opens the rear door 131. As a result, the user can access the jammed sheet S and perform jam handling.

In a case where a jam occurs in a state where the leading edge of the sheet S is between the conveyance roller pair 161 and the registration roller pair 81, the user pulls out the cassette 72 from the apparatus body 1A in the X1 direction. Further, the user opens the duplex conveyance guide 160 downward about the pivot center 160*p* to open the duplex conveyance path 183. As a result, the user can access the sheet S jammed in the duplex conveyance path 183, and can perform jam handling. When the duplex conveyance path 183 is opened downward, a nip of the conveyance roller pair 162 is separated, but the nip of the conveyance roller pair 161 is not separated. With such a configuration, the user who has accessed the duplex conveyance path 183 downstream of the duplex conveyance path 183 in the X1 direction can easily find the sheet S jammed in the duplex conveyance path 183, and jam handling performance can be improved.

Arrangement of Motor

Figure 4:
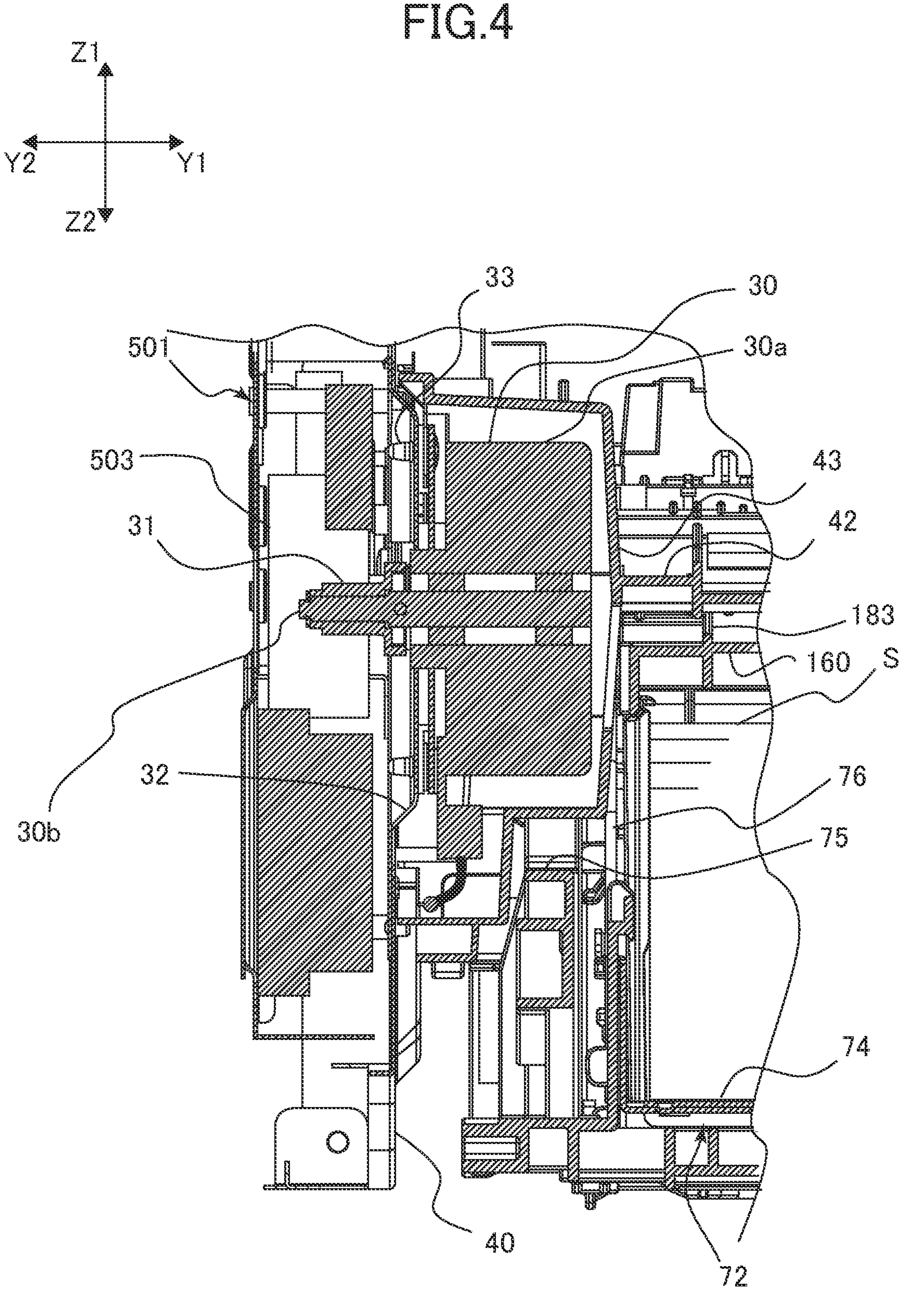
FIG. 4 is a cross-sectional view taken along line 4A-4A of FIG. 3.
Figure 5:
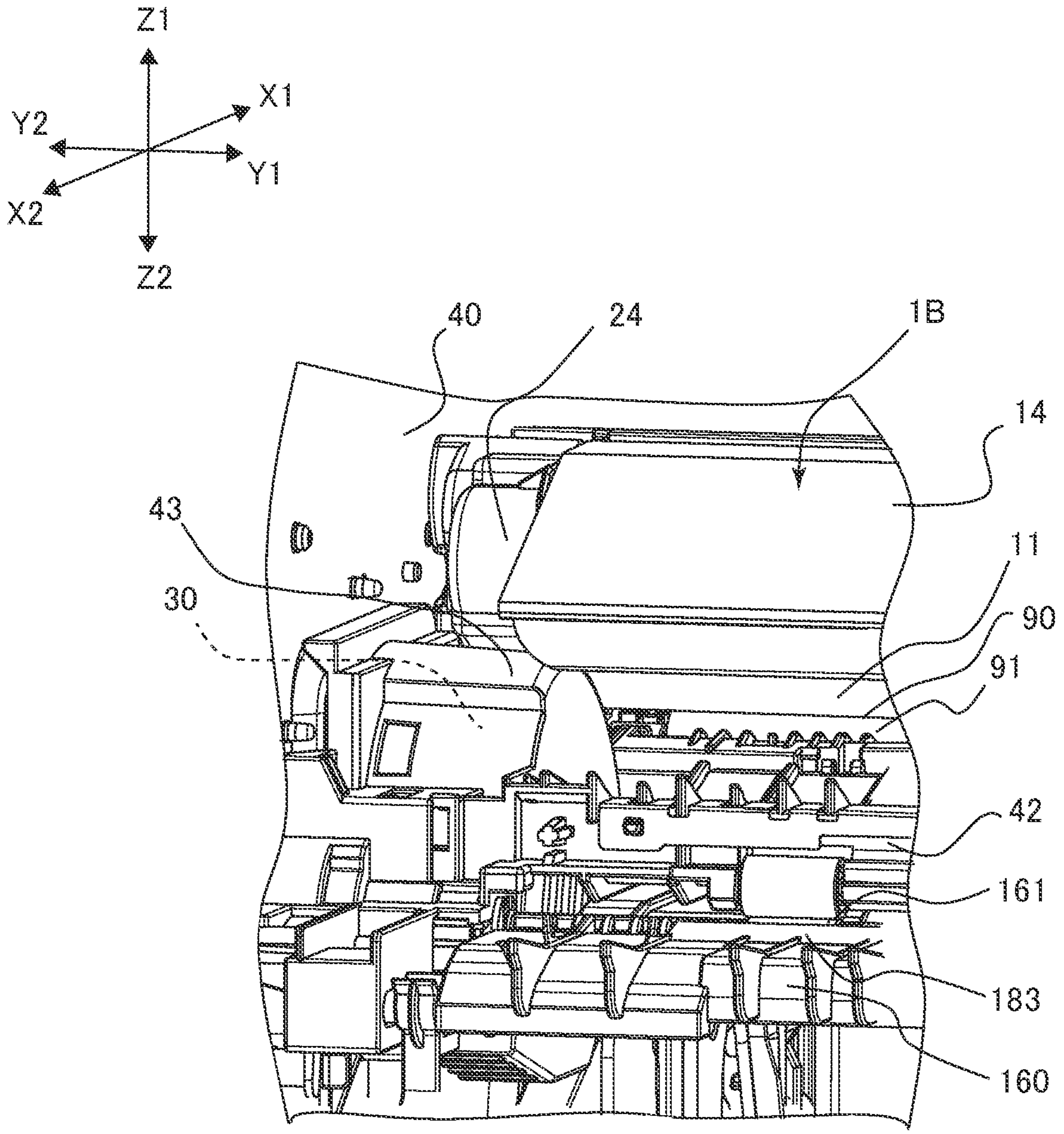
FIG. 5 is a perspective view illustrating the peripheral configuration of the motor.
Figure 6:
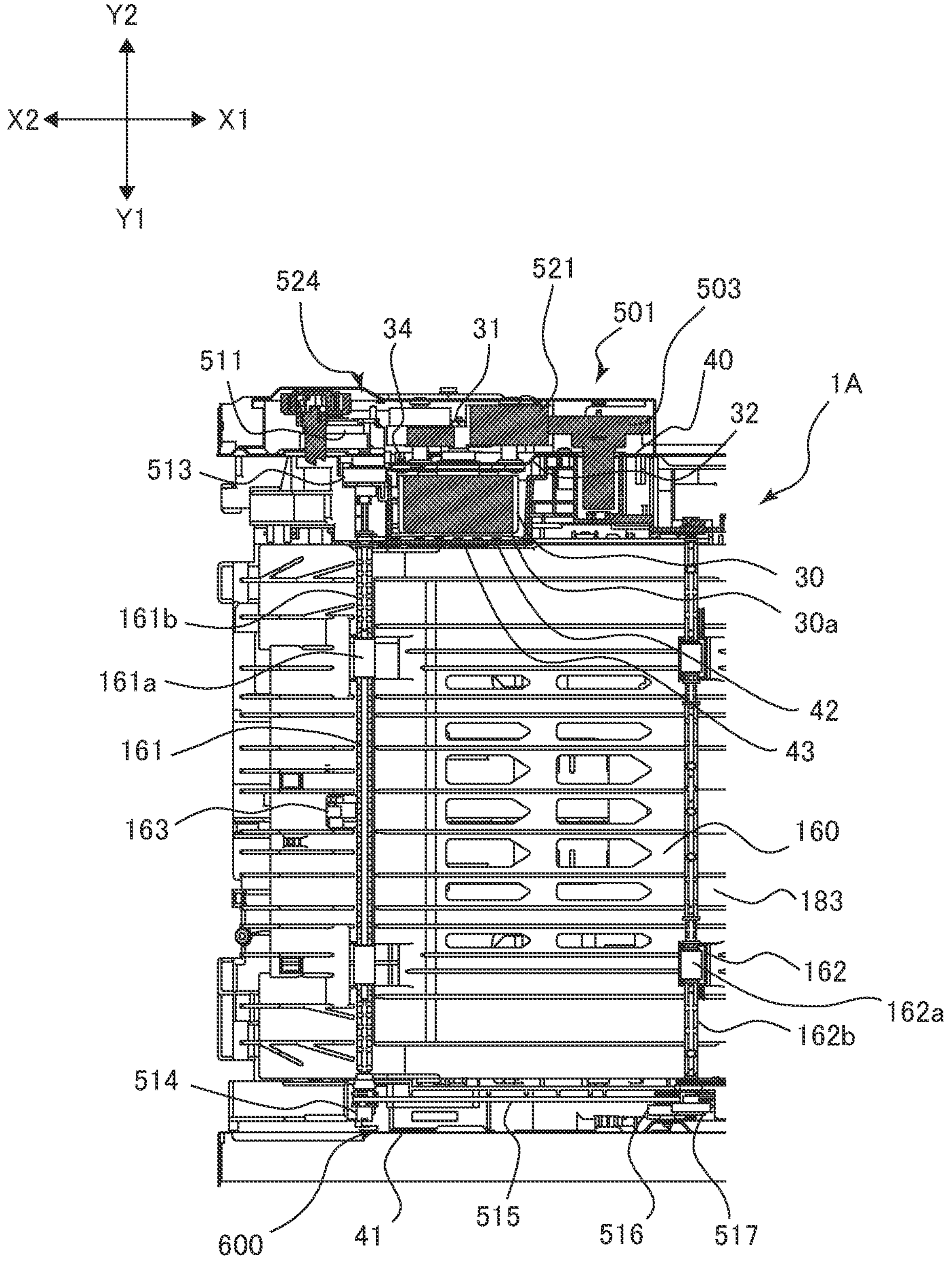
FIG. 6 is a cross-sectional view taken along line 6A-6A of FIG. 3.

Next, the arrangement of the motor 30 will be described with reference to FIGS. 1 to 6. FIG. 3 is a cross-sectional view illustrating a peripheral configuration of the motor 30. FIG. 4 is a cross-sectional view taken along line 4A-4A of FIG. 3. FIG. 5 is a perspective view illustrating the peripheral configuration of the motor 30. FIG. 6 is a cross-sectional view taken along line 6A-6A of FIG. 3. In FIG. 5, the fixing portion 101 is removed, and in FIGS. 1 and 3, a motor cover portion 43 described below is not illustrated, so that the arrangement of the motor 30 can be seen.

As illustrated in FIGS. 1 and 3, the motor 30 serving as a drive source is disposed between the transfer roller 91 and the fixing portion 101 when viewed in the X direction. In other words, the motor 30 is disposed between the transfer nip N1 and the fixing nip N2 in a sheet conveyance direction CD of the conveyance roller pair 161 illustrated in FIG. 3. The sheet conveyance direction CD is a traveling direction of the sheet conveyed by the conveyance roller pair 161, and is a direction parallel to the X direction. That is, the motor 30 is disposed between the transfer nip N1 and the fixing nip N2 in the X direction serving as a second direction. A center frame 42 is disposed above the duplex conveyance guide 160, and the center frame 42 connects a right side plate 40 (see FIG. 6) and a left side plate 41 described below. As illustrated in FIG. 3, the motor 30 is disposed so as to overlap the duplex conveyance guide 160 and the center frame 42 when viewed in the X direction.

As illustrated in FIGS. 3 and 5, a stirring member 23 that rotates to stir the waste toner in the waste toner storage portion 14 is provided inside the waste toner storage portion 14. The stirring member 23 is driven by a stirring drive portion 24 driven by the driving force transmitted from the motor 30. The stirring drive portion 24 is disposed downstream of the waste toner storage portion 14 in the Y2 direction, and is implemented by, for example, one gear or a plurality of gears.

As illustrated in FIG. 5, the motor 30 is covered by the motor cover portion 43 provided integrally with the center frame 42. More specifically, a rotor portion 30*a* of the motor 30 described below is covered by the right side plate 40 and the motor cover portion 43. The motor 30 is disposed close to the photosensitive drum 11 of the process cartridge 1B, and the motor 30 and the motor cover portion 43 are disposed so as not to interfere with the waste toner storage portion 14 and the stirring drive portion 24 in the X1 direction and the Z1 direction. In other words, as illustrated in FIG. 3, the motor 30 is disposed so as not to overlap the waste toner storage portion 14 and the stirring drive portion 24 when viewed in the Y direction. That is, the motor 30 is disposed close to the photosensitive drum 11 while securing a space for disposing the waste toner storage portion 14 and the stirring drive portion 24.

As illustrated in FIGS. 1, 3, and 4, the cassette 72 serving as a sheet accommodation portion that accommodates the sheet S is disposed below the motor 30 in the vertical direction (Z direction). The cassette 72 is provided with a pair of side regulating plates 76 serving as sheet regulating portions that regulate a position of the sheet S supported by the middle plate 74 in the X direction. The apparatus body 1A is provided with a cassette case 75 that holds the cassette 72 in an insertable and removable manner, and the motor 30 is disposed so as to secure a space for disposing the cassette case 75.

Further, the motor 30 and the motor cover portion 43 are disposed so as to partially overlap the cassette 72 and the side regulating plate 76 when viewed in the Y direction. As illustrated in FIG. 4, the motor 30 is disposed so as not to overlap the cassette 72 and the side regulating plate 76 when viewed in the X direction, but the motor cover portion 43 partially overlaps the side regulating plate 76 in the Y direction. That is, the motor 30 is disposed close to the sheet S accommodated in the cassette 72 in the Y direction while securing a space for disposing the cassette 72 and the side regulating plate 76. Note that the cassette 72 refers only to a box-shaped cassette body that accommodates the sheet S, and does not include, for example, a decorative cover or the like attached to a front surface of the cassette body.

As illustrated in FIGS. 1 and 3, the apparatus body 1A includes a fan 35 that cools the motor 30 by blowing air to the motor 30. The fan 35 is disposed between the right side plate 40 and the left side plate 41 described below in the Y direction, and is supported by an inner surface of the right side plate 40. The fan 35 is disposed below the fixing portion 101 and the duplex conveyance path 183 in the vertical direction (Z direction).

Arrangement of Conveyance Roller Pair

Next, the arrangement of the conveyance roller pair 161 for conveying the sheet S in the duplex conveyance path 183 and a peripheral configuration thereof will be described in detail with reference to FIGS. 3 and 6. As illustrated in FIG. 3, the conveyance roller pair 161 is disposed between the motor 30 and the fixing portion 101 when viewed in the X direction. In other words, the conveyance roller pair 161 is disposed between the motor 30 and the fixing nip N2 in the sheet conveyance direction CD.

The fixing portion 101 can be removed from the apparatus body 1A in the X2 direction by opening the rear door 131.

Since the conveyance roller pair 161 is disposed upstream of the fixing portion 101 in the X2 direction, the conveyance roller pair 161 does not interfere with the fixing portion 101 when the fixing portion 101 is attached to or detached from the apparatus body 1A. Therefore, replaceability and maintainability of the fixing portion 101 can be improved.

The conveyance roller pair 161 includes a roller shaft **161*b* and a roller portion 161*a* fixed to the roller shaft 161*b*. A roller gear 513 serving as a drive input portion that inputs the driving force from the motor 30 to the roller shaft 161*b* is fixed to a downstream end (end portion) of the roller shaft 161*b* in the Y2 direction. As illustrated in FIG. 6, the roller gear 513 is disposed so as to overlap the motor 30 in the Y direction and not to overlap the motor 30 in the X direction. As a result, the roller gear 513 and the motor 30 can be disposed near an end portion of the sheet S passing through the duplex conveyance path 183 in the Y direction, and the image forming apparatus 1** can be downsized in the Y direction.

Figure 8:
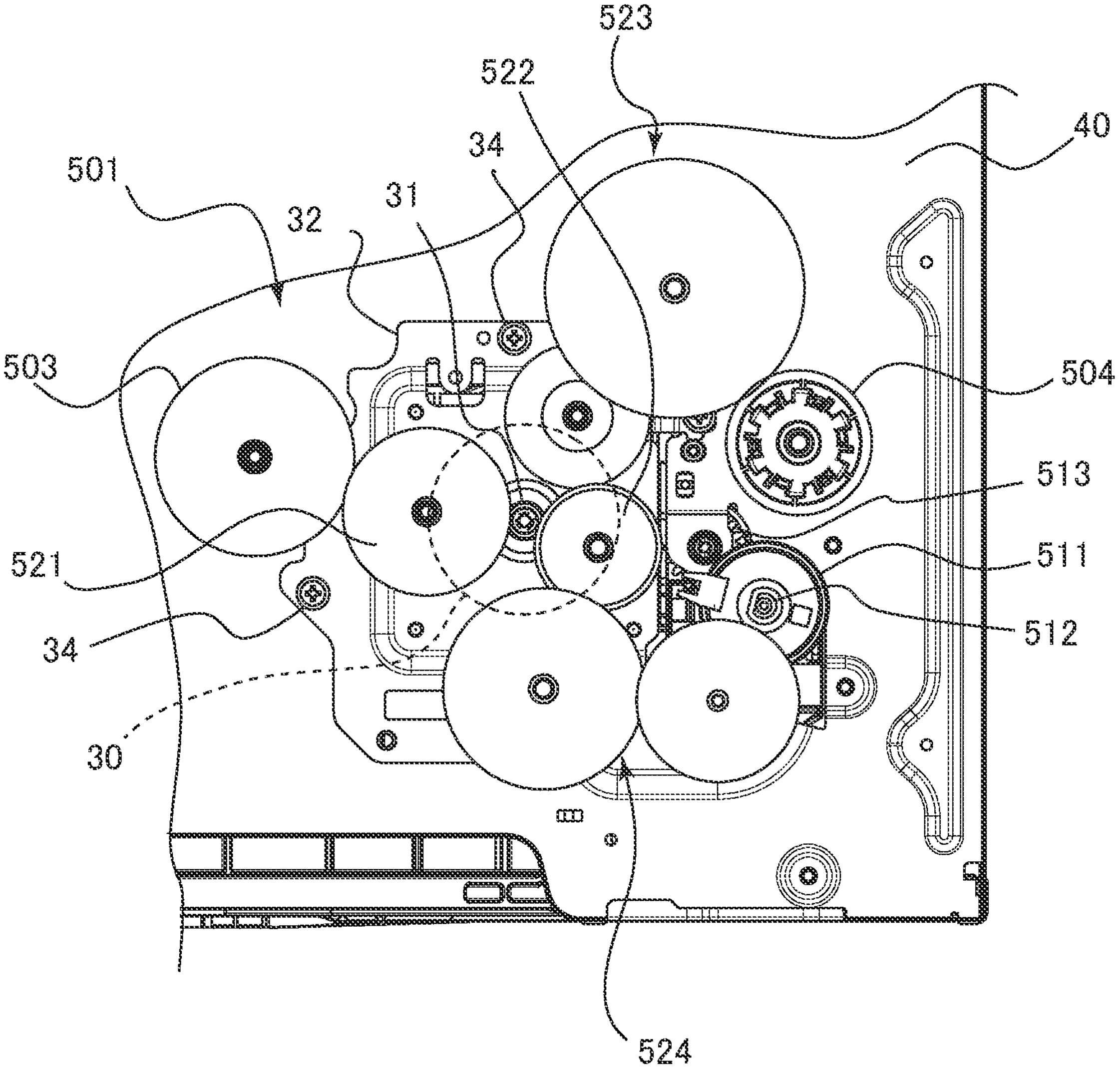
FIG. 8 is a rear view illustrating a drive transmission portion.

As illustrated in FIG. 8 described below, the roller gear 513 overlaps the motor 30 in the vertical direction (Z direction). Further, as illustrated in FIG. 3, the roller gear 513 and the conveyance roller pair 161 overlap a part of the fixing portion 101 (for example, a fixing frame 105) in the X direction and the Z direction. As a result, the fixing portion 101, the motor 30, the conveyance roller pair 161, and the roller gear 513 can be disposed close to the cassette 72 in the vertical direction (Z direction), and the image forming apparatus 1 can be downsized.

Attachment Configuration of Motor

Figure 7:
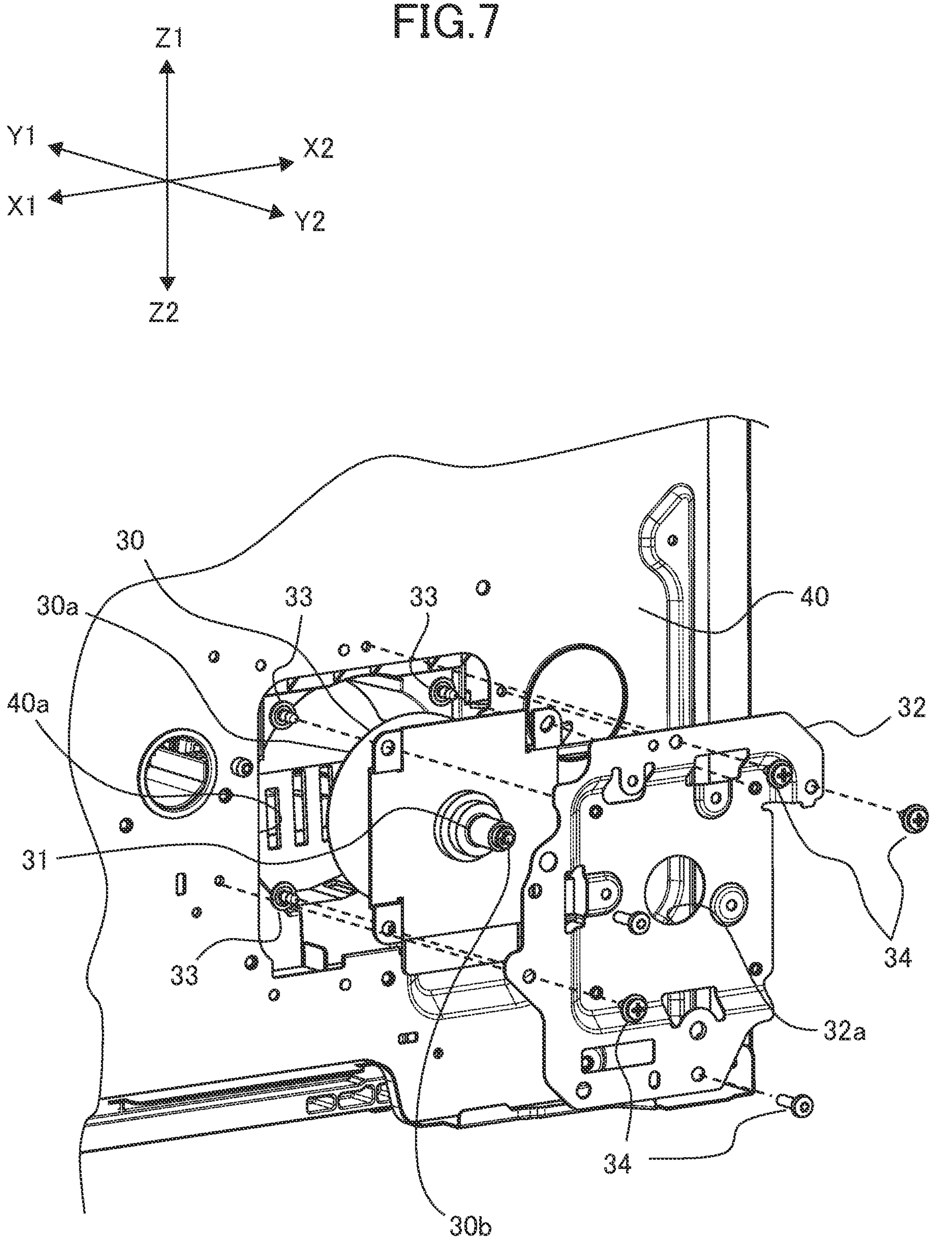
FIG. 7 is an exploded perspective view illustrating an attachment configuration of the motor.

Next, an attachment configuration of the motor 30 will be described with reference to FIGS. 4, 6, and 7. FIG. 7 is an exploded perspective view illustrating the attachment configuration of the motor 30. As illustrated in FIG. 6, the apparatus body 1A includes the right side plate 40 serving as a first side plate that supports the motor 30, and the left side plate 41 serving as a second side plate that is disposed on a side opposite to the right side plate 40 across the duplex conveyance path 183 in the Y direction.

As illustrated in FIGS. 4, 6, and 7, the motor 30 includes the rotor portion **30*a* that generates the driving force, an output shaft 30*b* that rotates together with the rotor portion 30*a*, and a pinion gear 31 serving as a drive transmission member fixed to the output shaft 30*b*. The motor 30 includes a stator (not illustrated) that does not rotate, and when the motor 30 is energized, the rotor portion 30*a* rotates together with the output shaft 30*b* and the pinion gear 31. For example, a DC motor such as a brushed DC motor is applied as the motor 30, but the motor 30 is not limited thereto. For example, a servo motor or a stepping motor may be used as the motor 30**.

The motor 30 is fixed to a motor attaching plate 32 by a motor screw 33. A through hole **32*a* is formed in the motor attaching plate 32, and the pinion gear 31 passes through the through hole 32*a* and is disposed on a side opposite to the rotor portion 30*a* with respect to the motor attaching plate 32. The motor attaching plate 32 is fixed to the right side plate 40 by a screw 34 downstream of the right side plate 40** in the Y2 direction.

As a result, the pinion gear 31 of the motor 30 protrudes downstream of the right side plate 40 in the Y2 direction, and the rotor portion **30*a* is disposed upstream of the right side plate 40 in the Y2 direction. In other words, the pinion gear 31 is disposed on a side opposite to the left side plate 41 with respect to the right side plate 40 in the Y direction, and the rotor portion 30*a* is disposed on the same side as the left side plate 41 with respect to the right side plate 40 in the Y direction. At this time, the rotor portion 30*a* is disposed more inward in the image forming apparatus 1 than the right side plate 40 through an opening 40*a* provided in the right side plate 40, and is covered by the motor cover portion 43. Therefore, it is possible to prevent the rotor portion 30*a* from coming into contact with the cassette 72, the side regulating plate 76, the sheet S accommodated in the cassette 72**, and the like.

In addition, since the rotor portion **30*a* of the motor 30 is disposed more inward the image forming apparatus 1 in the Y direction than the right side plate 40, the image forming apparatus 1 can be downsized in the Y direction. Further, the motor 30 is supported by the right side plate 40 by fixing the motor attaching plate 32 to the right side plate 40 downstream of the right side plate 40 in the Y2 direction by using the screw 34. Therefore, the motor 30 and the motor attaching plate 32 can be removed from the right side plate 40 by removing the screw 34 downstream of the right side plate 40 in the Y2 direction, that is, by removing the screw 34 from the outside of the image forming apparatus 1 in the Y direction. Therefore, the maintainability of the motor 30** can be improved.

Drive Transmission Portion

Next, a drive transmission portion 501 that transmits the driving force of the motor 30 will be described with reference to FIG. 8. FIG. 8 is a rear view illustrating the drive transmission portion 501. That is, FIG. 8 is a view of the drive transmission portion 501 supported by the right side plate 40 from an upstream perspective in the Y1 direction. In FIG. 8, a gear train that performs drive transmission from the motor 30 to the sheet feeding portion 70 and the discharge reversing unit 111 is omitted.

As illustrated in FIG. 8, the drive transmission portion 501 includes a plurality of gears, and transmits the driving force of the pinion gear 31 of the motor 30 to the photosensitive drum 11, the pressure roller 103, the conveyance roller pair 161, and the like. In the drive transmission portion 501, a drum drive gear 503 serving as an output gear and one idler gear 521 are provided in a path through which the drive transmission is performed from the pinion gear 31 to the photosensitive drum 11. The drum drive gear 503 serving as the output gear outputs the driving force to the photosensitive drum 11 via a gear coupling (not illustrated). The idler gear 521 meshes with the pinion gear 31 and the drum drive gear 503, and transmits the driving force of the motor 30 to the drum drive gear 503.

Here, a motor described in JP 2016-45375 A is disposed away from a photosensitive drum, and a gear train for transmitting a driving force of the motor to the photosensitive drum includes a drum drive gear and a plurality of idler gears. As described above, when the photosensitive drum and the motor are disposed away from each other, the number of gears for transmitting the driving force of the motor to the photosensitive drum increases. Then, a rotational speed of the photosensitive drum becomes unstable due to an influence of speed variation caused by the meshing of the gears, and there is a possibility that an image defect such as image unevenness occurs.

On the other hand, the motor 30 according to the present embodiment is disposed close to the photosensitive drum 11 in the X direction, and only one idler gear 521 is provided between the pinion gear 31 of the motor 30 and the drum drive gear 503 that outputs the driving force to the photosensitive drum 11. Therefore, it is possible to suppress the influence of the speed variation caused by the meshing of the gears in the drive transmission path from the pinion gear 31 to the drum drive gear 503, and to rotate the photosensitive drum 11 at a stable speed. Accordingly, an image defect such as image unevenness can be suppressed, and a high-quality image can be formed on a sheet.

In the drive transmission portion 501, a first gear train 523 including a gear 522 meshing with the pinion gear 31 and a pressure roller gear 504 are provided in a path through which the drive transmission is performed from the pinion gear 31 to the pressure roller 103. The pressure roller gear 504 outputs the driving force to the pressure roller 103 of the fixing portion 101. The driving force of the pinion gear 31 of the motor 30 is transmitted to the pressure roller gear 504 via the first gear train 523. In the drive transmission portion 501, a second gear train 524 meshing with the gear 522, an electromagnetic clutch 511, a clutch output gear 512, and the roller gear 513 are provided in a path through which the drive transmission is performed from the pinion gear 31 to the conveyance roller pair 161. The roller gear 513 outputs the driving force to the conveyance roller pair 161. The driving force of the pinion gear 31 is transmitted to the roller gear 513 via the gear 522, the second gear train 524, the electromagnetic clutch 511, and the clutch output gear 512.

The electromagnetic clutch 511 can interrupt or connect the drive between the second gear train 524 and the clutch output gear 512 by being in an energized state or a non-energized state. As a result, the conveyance roller pair 161 can rotate and stop in a state where the motor 30 is driven.

The drive transmission portion 501 is disposed between the right side plate 40 and an exterior (not illustrated) of the image forming apparatus 1 in the Y direction. The pinion gear 31 of the motor 30 is disposed on an outer side of the right side plate 40 in the Y direction, and the rotor portion 30*a* of the motor 30 is disposed on an inner side of the right side plate 40 in the Y direction. Therefore, the image forming apparatus 1 can be downsized in the Y direction.

Further, as illustrated in FIG. 6, a drive transmission mechanism 600 is provided on a side opposite to the motor 30 and the drive transmission portion 501 across the duplex conveyance path 183 in the Y direction. The drive transmission mechanism 600 is disposed between the left side plate 41 and the duplex conveyance path 183 in the Y direction, and transmits, to the conveyance roller pair 162, the driving force input from the motor 30 to the conveyance roller pair 161 via the drive transmission portion 501.

The conveyance roller pair 162 includes a roller shaft 162*b* and a roller portion 162*a* fixed to the roller shaft 162*b*. The drive transmission mechanism 600 includes a pulley 514, a pulley gear 516, a timing belt 515, and a roller drive gear 517. The pulley 514 is fixed to an end portion of the roller shaft 161*b* of the conveyance roller pair 161 on a side opposite to the roller gear 513, that is, a downstream end in the Y1 direction. The roller drive gear 517 is fixed to a downstream end of the roller shaft 162*b* in the Y1 direction.

The timing belt 515 is wound around the pulley 514 and a pulley portion of the pulley gear 516, and transmits rotation of the pulley 514 to the pulley gear 516. The gear portion of the pulley gear 516 meshes with the roller drive gear 517. That is, the driving force transmitted from the motor 30 to the conveyance roller pair 161 is transmitted to the conveyance roller pair 162 via the pulley 514, the timing belt 515, the pulley gear 516, and the roller drive gear 517. Therefore, the conveyance roller pairs 161 and 162 are driven in conjunction with each other. Therefore, in a case where the conveyance roller pair 161 is stopped by the electromagnetic clutch 511 interrupting the drive, the conveyance roller pair 162 is also stopped. In a case where the conveyance roller pair 162 rotates by the electromagnetic clutch 511 connecting the drive, the conveyance roller pair 161 also rotates.

As the drive transmission mechanism 600 is disposed on the side opposite to the motor 30 across the duplex conveyance path 183 in the Y direction, a space between the duplex conveyance path 183 and the left side plate 41 can be effectively used, and the image forming apparatus 1 can be downsized in the Y direction.

As described above, in the present embodiment, the motor 30 is disposed between the transfer roller 91 and the fixing portion 101 when viewed in the Y direction, and is disposed close to the photosensitive drum 11. At this time, the motor 30 is disposed so as not to interfere with the waste toner storage portion 14 and the stirring drive portion 24 in the X1 direction and the Z1 direction. The motor 30 is disposed so as not to interfere with the cassette 72 and the side regulating plate 76 in the X1 direction and the Z2 direction.

As the motor 30 is disposed close to the photosensitive drum 11 as described above, the drive between the pinion gear 31 of the motor 30 and the drum drive gear 503 is connected by only one idler gear 521. As a result, it is possible to suppress the influence of the speed variation caused by the meshing of the gears in the drive transmission path from the pinion gear 31 to the drum drive gear 503, and to rotate the photosensitive drum 11 at a stable speed. Therefore, an image defect such as image unevenness can be suppressed, and a high-quality image can be formed on a sheet.

Furthermore, in the present embodiment, the conveyance roller pair 161 is disposed between the motor 30 and the fixing portion 101 when viewed in the Y direction. As the rotor portion 30*a* of the motor 30 is disposed on the inner side of the right side plate 40 in the apparatus, the motor 30 is disposed close to the sheet S accommodated in the cassette 72 in the Y direction. The roller gear 513 is disposed so as to overlap the motor 30 in the Y direction. Further, the drive transmission mechanism 600 that connects the drive of the conveyance roller pair 161 and 162 is disposed using a space between the duplex conveyance path 183 and the left side plate 41 in the Y direction. As a result, the image forming apparatus 1 can be downsized in the Y direction.

In the present embodiment, the conveyance roller pairs 161 and 162 are disposed so as to overlap each other in the Z direction, and the roller gear 513 is disposed so as to overlap the motor 30 in the Z direction. The roller gear 513 and the conveyance roller pair 161 overlap a part (for example, the fixing frame) of the fixing portion 101 in the Y direction. As a result, the fixing portion 101, the motor 30, the conveyance roller pairs 161 and 162, and the roller gear 513 can be disposed close to the cassette 72 in the vertical direction (Z direction), and the image forming apparatus 1 can be downsized in the Z direction.

The conveyance roller pairs 161 and 162 are disposed such that a sheet such as a vertical A5-sized sheet, an A4-sized sheet, or an LTR-sized sheet can be stably conveyed on the duplex conveyance path 183. As a result, the image forming apparatus 1 can be downsized, and duplex printing can be performed on sheets of various sizes.

Second Embodiment

Next, a second embodiment of the present invention will be described. The second embodiment is different from the image forming apparatus 1 according to the first embodiment in a shape of a conveyance path and arrangement of each component. Hereinafter, a configuration having a function similar to that of the image forming apparatus 1 according to the first embodiment will be described in a manner of omitting illustration or attaching the same reference numerals in the drawings.

Figure 9:
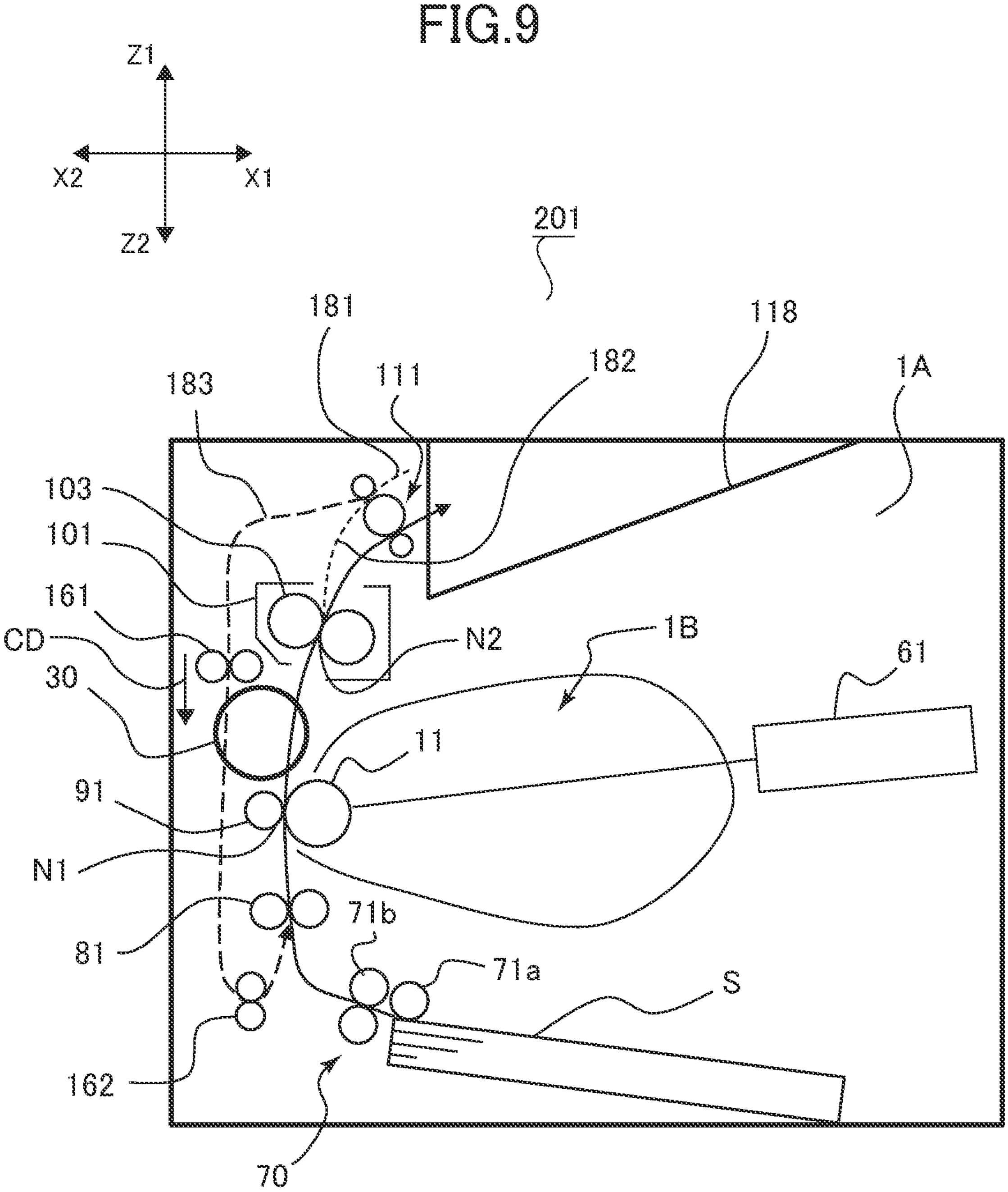
FIG. 9 is a cross-sectional view illustrating an image forming apparatus according to a second embodiment.

FIG. 9 is an overall schematic view illustrating an image forming apparatus 201 when viewed in a Y direction. As illustrated in FIG. 9, the image forming apparatus 201 according to the second embodiment includes an apparatus body 1A and a process cartridge 1B detachably supported by the apparatus body 1A. A sheet feeding portion 70, a photosensitive drum 11, a fixing portion 101, and a discharge reversing unit 111 provided in the apparatus body 1A are disposed side by side in the vertical direction (Z direction). That is, in the present embodiment, the Y direction serving as a first direction is similar to that in the first embodiment, but a second direction parallel to a sheet conveyance direction CD in a conveyance roller pair 161 corresponds to a Z direction. A third direction orthogonal to both of the first direction and the second direction corresponds to an X direction.

When viewed in the Y direction, a motor 30 is disposed between a transfer roller 91 and a fixing portion 101 and is disposed so as not to interfere with the process cartridge 1B. In other words, the motor 30 is disposed between the transfer roller 91 and the fixing portion 101 in the Z direction. The conveyance roller pairs 161 and 162 are disposed on a duplex conveyance path 183, and the conveyance roller pair 161 is disposed between the fixing portion 101 and the motor 30 when viewed in the Y direction. The conveyance roller pair 161 is disposed so as to at least partially overlap the fixing portion 101 and the motor 30 in the X direction.

Although not illustrated in FIG. 9, the apparatus body 1A of the image forming apparatus 201 includes a right side plate 40 and a left side plate 41 (see FIG. 6), and a rotor portion 30*a* of the motor 30 is disposed on an inner side of the right side plate 40 in the apparatus in the Y direction as in the first embodiment. Further, a roller gear 513 that inputs a driving force to the conveyance roller pair 161 is disposed so as to overlap the motor 30 in the Y direction, so as to overlap the motor 30 in the X direction, and so as not to overlap the motor 30 in the Z direction.

In addition, since the motor 30 is disposed close to the photosensitive drum 11, the same effects as those of the first embodiment are obtained. That is, it is possible to suppress an influence of speed variation caused by meshing of the gears in a drive transmission path from a pinion gear 31 to a drum drive gear 503, and to rotate the photosensitive drum 11 at a stable speed. Therefore, an image defect such as image unevenness can be suppressed, and a high-quality image can be formed on a sheet.

Furthermore, a configuration for downsizing the image forming apparatus 201 in the Y direction and the Z direction is also similar to that of the first embodiment. The conveyance roller pairs 161 and 162 are disposed such that a sheet such as a vertical A5-sized sheet, an A4-sized sheet, or an LTR-sized sheet can be stably conveyed on the duplex conveyance path 183. As a result, the image forming apparatus 201 can be downsized, and duplex printing can be performed on sheets of various sizes.

Other Embodiments

In any of the embodiments described above, the process cartridge 1B and the toner cartridge 1C are attachable to and detachable from the apparatus body 1A, but the present technology is not limited thereto. The number of cartridges attachable to and detachable from the apparatus body 1A can be arbitrarily set, and for example, the process cartridge 1B may be undetachable from the apparatus body 1A.

In any of the embodiments described above, the drive transmission is performed from the drum drive gear 503 to the photosensitive drum 11 using the gear coupling, but the present technology is not limited thereto. For example, other couplings such as an Oldham's coupling may be used instead of the gear coupling.

In any of the embodiments described above, the motor 30 is attached on the outer side of the right side plate 40 using the motor attaching plate 32, but the present technology is not limited thereto. For example, the motor 30 may be attached on the inner side of the right side plate 40 without using the motor attaching plate 32.

In any of the embodiments described above, the fan 35 blows air to the motor 30 to cool the motor 30, but the fan 35 may cool other cooling targets other than the motor 30. For example, the sheet S conveyed through the process cartridge 1B, the fixing portion 101, or the discharge reversing unit 111 is considered as the cooling target.

In any of the embodiments described above, the drive transmission mechanism 600 performs the drive transmission using the pulley 514 and the timing belt 515, but the present technology is not limited thereto. For example, the drive transmission mechanism 600 may perform the drive transmission using a gear train.

In any of the embodiments described above, the drive transmission portion 501 transmits the driving force using the plurality of gears, but the present technology is not limited thereto. For example, a pinion pulley may be used instead of the pinion gear 31, and the drive transmission portion 501 may transmit the driving force by a timing belt wound around the pinion pulley.

In any of the embodiments described above, the image forming apparatus is configured to directly transfer a toner image from the photosensitive drum 11 to the sheet S. However, the present technology is not limited thereto. For example, the toner image on the photosensitive drum 11 may be transferred to the sheet S via an intermediate transfer belt. That is, the present technology may be applied not only to an image forming apparatus such as a monochrome printer but also to a full-color image forming apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-075871, filed May 1, 2023, which is hereby incorporated by reference herein in its entirety.

What is claimed is:

1. An image forming apparatus comprising:

an image forming portion including:

a photosensitive member that is rotatably supported about a rotation shaft extending in a first direction and bears a toner image; and a transfer member that transfers the toner image to a sheet;

a fixing portion configured to fix the toner image transferred by the transfer member to the sheet;

a reverse conveyance portion configured to reverse and convey the sheet conveyed by the fixing portion;

a conveyance path configured to guide the sheet reversed by the reverse conveyance portion toward the transfer member again;

a conveyance portion configured to convey the sheet in the conveyance path;

a drive source configured to drive the photosensitive member and the conveyance portion; and a drive input portion configured to input a driving force transmitted from the drive source to the conveyance portion, the drive input portion being attached to the conveyance portion, wherein the drive source is disposed between the transfer member and the fixing portion in a second direction parallel to a sheet conveyance direction in the conveyance portion, the drive input portion is disposed so that (i) a position of the drive input portion overlaps a position of the drive source with respect to the first direction, (ii) the position of the drive input portion overlaps the position of the drive source with respect to a third direction orthogonal to both of the first direction and the second direction, and (iii) the position of the drive input portion does not overlap the position of the drive source with respect to the second direction, the drive source includes:

a rotor portion that generates a driving force;

an output shaft that rotates together with the rotor portion; and a drive transmission member fixed to the output shaft, the image forming apparatus further comprises:

a first side plate configured to support the drive source; and a second side plate disposed on a side opposite to the first side plate across the conveyance path in the first direction, the drive transmission member is disposed on a side opposite to the second side plate with respect to the first side plate in the first direction, and the rotor portion is disposed between the first side plate and the conveyance path in the first direction.

2. The image forming apparatus according to claim 1, wherein the drive transmission member is a pinion gear, and the image forming apparatus further comprises:

an output gear configured to output the driving force to the photosensitive member; and one idler gear configured to mesh with the pinion gear and the output gear and transmit the driving force of the drive source to the output gear.

3. The image forming apparatus according to claim 1, wherein the conveyance portion is a first conveyance portion, the image forming apparatus further comprises:

a second conveyance portion configured to convey the sheet conveyed by the first conveyance portion toward the transfer member in the conveyance path; and a drive transmission mechanism configured to transmit, to the second conveyance portion, the driving force input from the drive source to the first conveyance portion via the drive input portion, and the drive transmission mechanism is disposed between the second side plate and the conveyance path in the first direction.

4. The image forming apparatus according to claim 1, further comprising a fan configured to cool the drive source by blowing air to the drive source, wherein the fan is disposed between the first side plate and the second side plate in the first direction, and is disposed below the fixing portion and the conveyance path.

5. The image forming apparatus according to claim 1, wherein the conveyance portion is disposed between the drive source and the fixing portion when viewed in the first direction.

6. The image forming apparatus according to claim 1, wherein the conveyance portion includes a roller shaft extending in the first direction and a roller portion fixed to the roller shaft, and the drive input portion is fixed to an end portion, in the first direction, of the roller shaft.

7. The image forming apparatus according to claim 1, further comprising:

a sheet accommodation portion configured to accommodate the sheet; and a sheet regulating portion provided in the sheet accommodation portion and configured to regulate a position, in the first direction, of the sheet supported by the sheet accommodation portion, wherein the drive source is disposed so as not to overlap the sheet regulating portion when viewed in the second direction.

8. The image forming apparatus according to claim 1, wherein the image forming portion includes a waste toner storage portion configured to store toner remaining on the photosensitive member after the toner image is transferred to the sheet by the transfer member, and the drive source is disposed so as not to overlap the waste toner storage portion when viewed in the first direction.

9. An image forming apparatus comprising:

an image forming portion including:

a photosensitive member that is rotatably supported about a rotation shaft extending in a first direction and bears a toner image; and a transfer member that transfers the toner image to a sheet;

a fixing portion configured to fix the toner image transferred by the transfer member to the sheet;

a reverse conveyance portion configured to reverse and convey the sheet conveyed by the fixing portion;

a conveyance path configured to guide the sheet reversed by the reverse conveyance portion toward the transfer member again;

a conveyance portion configured to convey the sheet in the conveyance path;

a drive source configured to drive the photosensitive member and the conveyance portion;

a drive input portion configured to input a driving force transmitted from the drive source to the conveyance portion, the drive input portion being attached to the conveyance portion; and a fan configured to cool the drive source by blowing air to the drive source, wherein the drive source is disposed between the transfer member and the fixing portion in a second direction parallel to a sheet conveyance direction in the conveyance portion, the drive input portion is disposed so that (i) a position of the drive input portion overlaps a position of the drive source with respect to the first direction, (ii) the position of the drive input portion overlaps the position of the drive source with respect to a third direction orthogonal to both of the first direction and the second direction, and (iii) the position of the drive input portion does not overlap the position of the drive source with respect to the second direction, the drive source includes:

a rotor portion that generates a driving force;

an output shaft that rotates together with the rotor portion; and a drive transmission member fixed to the output shaft, the image forming apparatus further comprises:

a first side plate configured to support the drive source; and a second side plate disposed on a side opposite to the first side plate across the conveyance path in the first direction, the drive transmission member is disposed on a side opposite to the second side plate with respect to the first side plate in the first direction, and the fan is disposed between the first side plate and the second side plate in the first direction, and is disposed below the fixing portion and the conveyance path.

10. The image forming apparatus according to claim 9, wherein the drive transmission member is a pinion gear, and the image forming apparatus further comprises:

an output gear configured to output the driving force to the photosensitive member; and one idler gear configured to mesh with the pinion gear and the output gear and transmit the driving force of the drive source to the output gear.

11. The image forming apparatus according to claim 9, wherein the rotor portion is disposed between the first side plate and the conveyance path in the first direction.

12. The image forming apparatus according to claim 9, wherein the conveyance portion is a first conveyance portion, the image forming apparatus further comprises:

a second conveyance portion configured to convey the sheet conveyed by the first conveyance portion toward the transfer member in the conveyance path; and a drive transmission mechanism configured to transmit, to the second conveyance portion, the driving force input from the drive source to the first conveyance portion via the drive input portion, and the drive transmission mechanism is disposed between the second side plate and the conveyance path in the first direction.

13. The image forming apparatus according to claim 9, wherein the conveyance portion is disposed between the drive source and the fixing portion when viewed in the first direction.

14. The image forming apparatus according to claim 9, wherein the conveyance portion includes a roller shaft extending in the first direction and a roller portion fixed to the roller shaft, and the drive input portion is fixed to an end portion, in the first direction, of the roller shaft.

15. The image forming apparatus according to claim 9, further comprising:

a sheet accommodation portion configured to accommodate the sheet; and a sheet regulating portion provided in the sheet accommodation portion and configured to regulate a position, in the first direction, of the sheet supported by the sheet accommodation portion, wherein the drive source is disposed so as not to overlap the sheet regulating portion when viewed in the second direction.

16. The image forming apparatus according to claim 9, wherein the image forming portion includes a waste toner storage portion configured to store toner remaining on the photosensitive member after the toner image is transferred to the sheet by the transfer member, and the drive source is disposed so as not to overlap the waste toner storage portion when viewed in the first direction.

* * * * *